June 9, 1964
A. KLEIN
3,136,925
ELECTRIC METER CONVERSION BRACKETS
Filed May 8, 1962
2 Sheets-Sheet 1
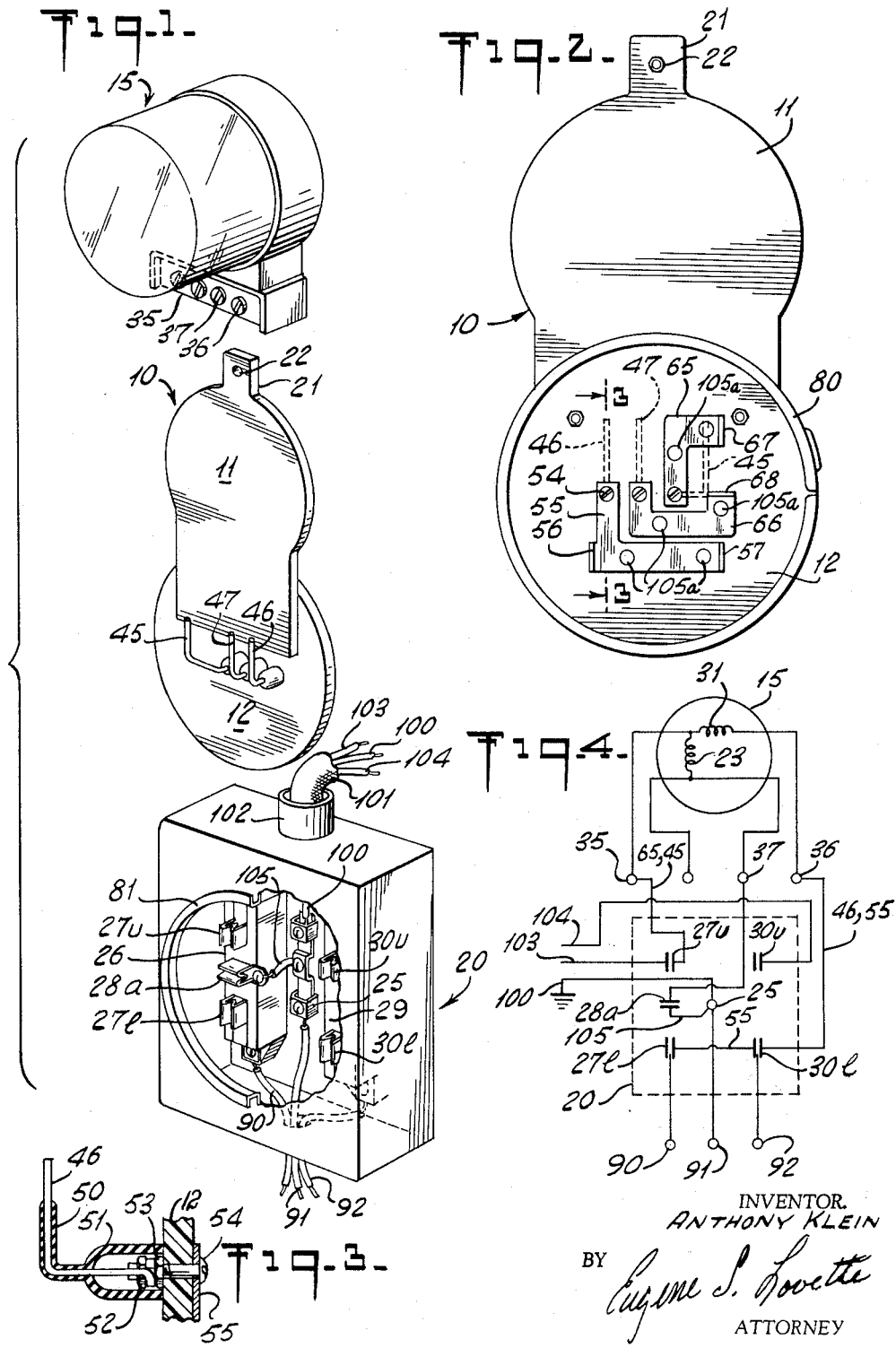
INVENTOR.
ANTHONY KLEIN
BY
Eugene S. Lovette
ATTORNEY June 9, 1964
A. KLEIN
3,136,925
ELECTRIC METER CONVERSION BRACKETS
Filed May 8, 1962
2 Sheets-Sheet 2
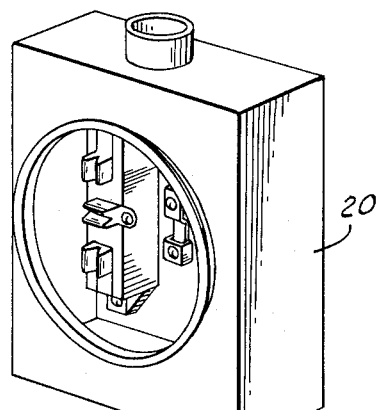
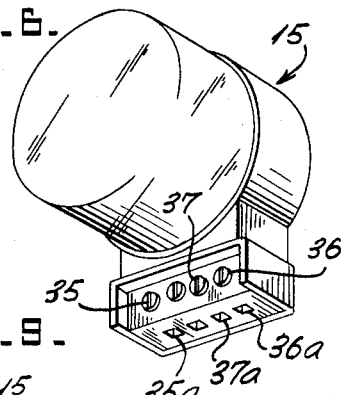
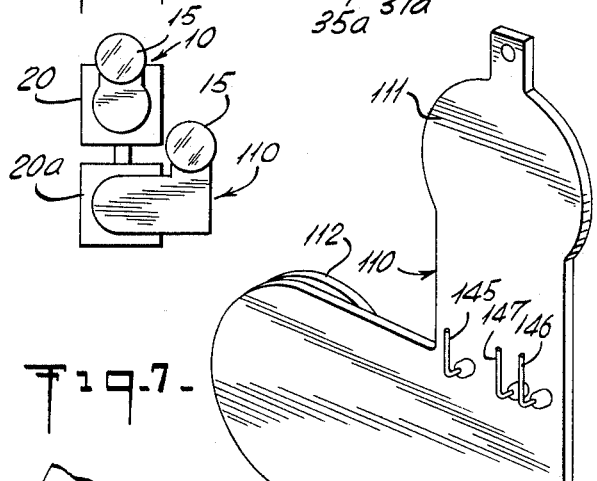
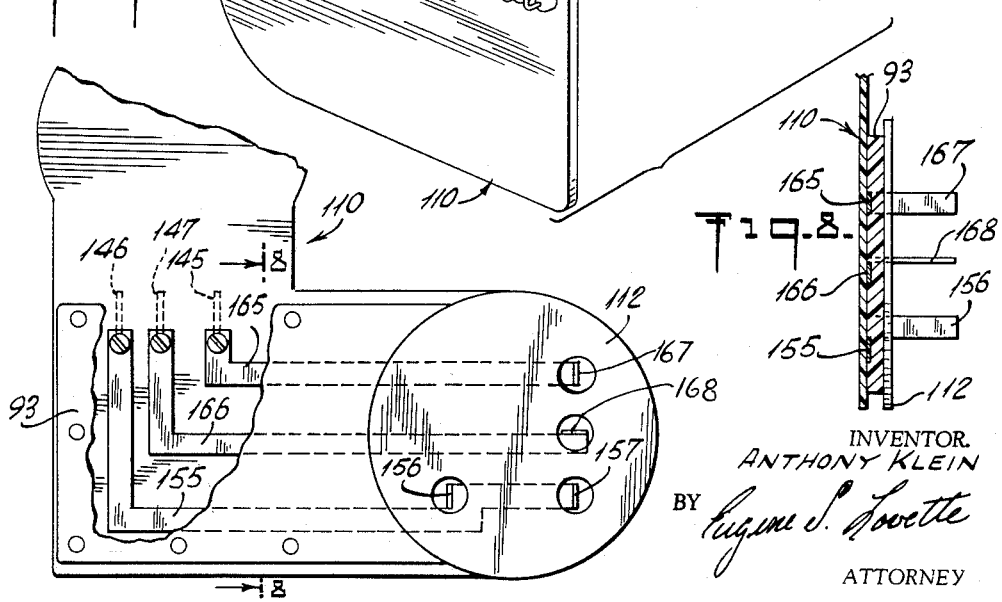
INVENTOR.
ANTHONY KLEIN
BY Eugene S. Lovette
ATTORNEY 3,136,925
Patented June 9, 1964

1

3,136,925
ELECTRIC METER CONVERSION BRACKETS
Anthony Klein, 49 Ave. A, Port Washington, N.Y.
Filed May 8, 1962, Ser. No. 193,271
8 Claims. (Cl. 317—107)

This invention relates to electrical service conversion, more particularly to means implementing the efficiency and safety with which previously installed electrical wiring systems may be converted so as to change available service capacities.

With the increased use of electrical equipment both industrially and residentially, it is often found necessary to change previously installed supply lines so as to accommodate the increased current requirements of the additional equipment employed by the electrical consumer. This necessitates a change in wiring at the service entry, and between the service entry and the building electrical system or load line. Where the electrical utility company meters the supply to the load line, the meter remains exclusively under the control of the utility company, while wiring changes are performed by the consumer's electrician.

In the usual situation, the consumer will call in his electrician to make the necessary wiring changes to permit desired service conversion and at some subsequent date, the electrical utility company changes the meter to accommodate this conversion. Problems arise in that meters are usually designed to handle given electrical service conditions. Where a conversion is made, it is necessary to change the meter to accommodate the desired service change. Thus, for example, with a conventionally installed 30 amp 110 volt service system, the meter installed by the utility company accommodates the load demands possible on such system. Where it is desired to convert this 30 amp system to 100 amp service, or where it is desired to convert to 220 volt service, such as to accommodate appliances and equipment having higher power requirements than previously available, after the necessary wiring changes have been made in the service lines, it is necessary for the utility company to provide a meter capable of handling the new load requirements.

Normally, the consumer's electrician will make the desired wiring changes, making temporary connections to the original meter to provide continuity of service. Thereafter, the utility company is called in to change the meter and make the connections necessary to provide the converted service. During the interval between the time that the electrician made the wiring changes, and the time the utility company appears to change the meter, the meter is temporarily secured in position. It is often found that this temporary securement of the meter results either in damage to the meter, interruption of service due to broken connections, and possible injury of those moving in proximity to the service entry.

It is with the above problems and desiderata in mind that the present means have been evolved, means implementing electrical service conversion providing for secure and efficient connection of the old meter into new service entry wiring so as to maintain continuity of service pending the utility company's change of the meter to accommodate new service requirements. The novel means serves to permit simple and rapid connection of the old meter

2 to the new service entry; and additionally serves to securely maintain the meter in a fashion preventing damage of the meter, injury of the consumer, or interference with electrical service.

It is accordingly a primary object of this invention to provide improved means for implementing electrical service conversion.

It is a further object of the invention to provide means implementing electrical service conversion in which the meter provided for the service prior to conversion will be effectively secured in a safe position pending replacement of the meter by the electrical utility company.

Another object of the invention is to provide meter supporting means preventing exposure of electrical wire pending change of the meter by the utility company during an electrical service conversion.

A further object of the invention is to provide means shielding the connections in a meter box or pan from inadvertent contact by those moving in proximity to the service entry connections, pending meter change during an electrical service conversion.

It is also an object of the invention to implement the facility of connection of an old meter in operative position during electrical service conversion.

These and other objects of the invention which will become hereafter apparent, are achieved by provision of a novel meter mounting and connecting bracket. The novel bracket is formed of a relatively thin electrically insulating rigid sheet member or board. The configuration of this board is preferably such as to provide a meter supporting area underlying the meter employed in the old electrical service system prior to conversion, and to include a meter pan covering area overlying the opening in the new meter pan provided for the new meter to be employed on the new service. Bus bars are secured to said board, and an electrically conductive connector is extended between each bus bar and the old meter. An additional electrically conductive connector is arranged between the bus bar and the supply line; and a connector is provided between the bus bar and the load line.

In use, the novel mounting bracket is conjoined with the old meter by coupling of the meter to the meter connector on the bracket, and positioning the bracket over the newly installed meter box so as to couple the meter to the new supply line in a fashion such as to maintain the original service connections and additionally couple the meter to the new load line. Pending replacement of the meter by the utility company, the original service is continued, and the meter held in secured position without any exposed connections.

A feature of the invention resides in the construction of the mounting and connection bracket of a configuration such as to close off the opening of the meter pan pending change of the old meter for the new, thereby preventing damage of the meter pan contacts, or injury to the consumer.

Another important feature of the invention resides in the facility with which the old meter may be secured in position pending provision of the new meter by the utility company, thereby cutting down on the time required by the electrician in effecting service conversion.

The specific details of a preferred embodiment of the invention, and the mode of functioning, will be made most manifest and particularly pointed out in clear, concise, and exact terms in conjunction with the accompanying drawings, wherein:

FIG. 1 is an exploded perspective view showing the novel mounting and connecting bracket prior to its assembly with the old service meter, and the new service meter pan;

FIG. 2 is a rear view of the mounting and connecting bracket shown in FIG. 1;

FIG. 3 is a cross-sectional view taken on line 3—3 of FIG. 2;

FIG. 4 is a schematic wiring diagram showing an old 110 volt two wire meter utilized to maintain service continuity after service conversion to a three wire system;

FIG. 5 is an exploded perspective view illustrating a multiple meter pan installation, showing how the novel meter mounting and connecting bracket is modified to accommodate this multiple meter pan arrangement;

FIG. 6 is a perspective view of a typical meter of the type used in conjunction with a residential wiring installation;

FIG. 7 is a partial detail of the rear view of the modified mounting and connecting bracket of FIG. 5;

FIG. 8 is a cross-sectional view taken on line 8—8 of FIG. 7; and

FIG. 9 is a schematic view of a multiple pan arrangement showing the bracket of the FIG. 5 embodiment in use with the bracket of the FIG. 1 embodiment.

Referring now, more particularly, to the drawings, like numerals in the various figures will be employed to designate like parts. As best seen in FIGS. 1 and 2, a novel meter mounting and connecting bracket 10 is formed with a meter supporting area 11 and a meter pan covering area 12. The bracket 10 is preferably formed of a relatively rigid electrically insulating material, such as plywood, sheet vinyl, or the like non-conducting material. The configuration of the meter supporting area is preferably congruent with the back area of meter 15, such as to underly and support the meter as seen in the upper portion of FIG. 1. The lower meter pan covering area 12 is of a configuration such as to close the opening in a meter box or pan 20 as seen in the lower portion of FIG. 1. Meter supporting area 11 is formed with an ear 21 having an aperture 22 permitting hanging of the meter bracket on a nail or the like depending member.

In the form of the invention illustrated in FIGS. 1 to 4, the inventive concept is shown as embodied in connection with bracket 10 adapted for use where one meter pan is employed in conjunction with the service entry. Meter pan 20 has a neutral bus 25 to which the neutral line 100 of the three wire service 101 is connected. It is understood that the three wire service 101 is brought into meter pan 20 through a pan inlet 102. Bus 25 includes a terminal screw to effect electrical connection to line 100. Pan 20 also includes an electrical insulator strip 26 for supporting an upper, resilient terminal jaw 27u, the upper end of which includes a conductive bus and a terminal screw, not shown, for electrical connection with a high red line 103 of the service line 101. Strip 26 also carries a lower, resilient terminal jaw 27l electrically isolated from the other conductive terminal jaws on strip 26.

Pan 20 also includes a second electrical insulator strip 29 provided with electrically isolated upper and lower, spring action terminal jaws 30u and 30l. In normal connection, a high black line 104 of the service 101 is electrically connected to the terminal screw of jaw 30u. A neutral, resilient terminal jaw 28a may be supported on either one of the strips 26, 29. In FIG. 1, terminal jaw 28a is shown mounted on strip 26. Terminal jaw 28a is electrically isolated from the other terminal jaws on strip 26. A wire 105 connects jaw 28a to neutral bus 25. The illustrated pan arrangement is equipped for a conventional three wire single phase installation providing a 220 volt potential between the two high input lines 103 and 104 of service 101 and a 110 volt potential between either of the high lines 103, 104 and neutral bus 25, or neutral line 100.

The meter 15 is of the type employed for measuring power consumption in a 110 volt, two wire entry system. Where a conversion has been made to a three wire system as illustrated, pending replacement of the old two wire meter 15 by the utility company, it is necessary to connect the old meter 15 into the new service wiring so as to provide for continuity of service. To this end, two of the wires, high red 103 and neutral line 100 of the three wire system 101, are coupled to meter 15 to provide for continuity of 110 volt service to the user during the interim period although the user is now wired with a three wire line.

The two wire connection as illustrated in FIG. 4 provides for connection of meter shunt coil 23 and meter series coil 31 in the three wire service and user lines. To accommodate the two wire connection to meter 15, an input terminal 35 and an output terminal 36 along with a neutral terminal 37 on meter 15, as best seen in FIGS. 1, 4 and 6, are designed to connect to the three wire service and user lines through connecting bracket 10.

Meter mounting bracket 10 carries a plurality of rod-like meter connections. These rod-like connections include an input meter terminal connector 45, an output meter terminal connector 46 and a neutral meter terminal connector 47. Each of the connectors 45, 46 and 47 is adapted for insertion in respective meter terminal sockets 35a, 36a and 37a, shown in FIG. 6.

Meter connectors 45, 46, 47 are mounted to bracket 10 and are formed to extend outwardly and upright from the front side thereof as shown in connection with connector 46 illustrated in FIG. 3. An insulator 50 extends around connector 46 starting from a portion thereof spaced from its free end, at which free end connector 46 enters into meter socket 36. An insulator sleeve 51 is formed integral with insulator 50. Sleeve 51 is arranged around nuts 52 and 53, between which nuts the inner end of connector 46 is secured by a bolt 54. Bolt 54 passes through pan cover area 12 of bracket 10.

A similar arrangement holds connectors 45 and 47 to bracket 10. A flat bus bar 55, as best seen in FIG. 2, is supported against the back side of bracket 10. Bus bar 55 is formed with prongs 56 and 57. Prongs 56, 57 are formed to extend orthogonal from the back face of pan cover area 12 and are equipped to mate conductively with resilient terminal jaws 30l and 27l, respectively, of meter pan 20. Bolt 54 passes through bus 55 to make conductive contact therewith. The head of bolt 54 is anchored against bus 55, see FIG. 3. It is thus understood that bus 55 is conductively connected to terminal rod connector 46 through bolt 54. Bus 55 also includes further bolt holes 105a for anchoring bus 55 against the back side of bracket 10.

Connectors 45, 47 are similarly electrically and mechanically coupled to respective bus bars 65 and 66 as seen in FIG. 2. The three bus bars 55, 65, 66 are electrically isolated from each other. But bar 65 has an othogonal and vertical prong 67 for conductive mating in resilient pan jaw 27u. Bus bar 66 has an orthogonal prong 68 extending horizontally to mate conductively into spring jaw 28a. When bracket 10 is mounted against the opening of pan 20, the foregoing described prongs will mate with the correlated and exposed spring jaws of pan 20.

Accordingly, it is understood that the three bus bars 55, 65, 66 and the prongs thereof are predeterminedly located on bracket 10 and dimensioned as to size to accomplish mating of each prong 56, 57, 67 and 68 with the correlated terminal jaws upon mounting of bracket 10 against pan 20. The rear face of pan cover area 12 may be provided with a peripheral clamp ring 80 designed to snap and mount over a peripheral flange 81 on the face of pan 20 in order to hold bracket 10 to pan 20.

FIG. 4 illustrates the connections effected by bracket 10 as the means of inserting meter 15 into the connection between service 101 and the three wire user lines. The output terminals from pan 20 are terminal screws conductively connected to jaw 27l, neutral bus 25 and jaw 30l. FIG. 1 at the bottom shows three user lines 90, 91, 92 connected to such output terminals. Lines 90, 91 and 92 extend from the bottom of pan 20 and normally feed into the user's fuse box, not shown. In the foregoing, input line 104 deadens on the electrically inactive jaw 30u until meter 15 is replaced by the 220 volt meter. During the interim, that is to say, before such replacement, the user lines 90 and 92 are connected together through bus 55, whereby the user is operating on 110 voltage between either line 90, 92 and neutral line 91.

In the embodiment of the invention illustrated in FIGS. 5-7, a modified novel mounting bracket 110 is formed with a meter pan covering area 112 off-set from a meter support portion 111 so that in assembled relationship where a plurality of meter pans are in proximity, one with respect to the other as seen in FIG. 5, each meter may be maintained in operative position with respect to its respective pan without interfering with the adjacent meter positioned as shown schematically in FIG. 9. For example, in the dual installation of FIGS. 5 and 9, two meter pans 20 and 20a are stacked vertically. This arrangement may be used for a two family house wherein each apartment of the house has its individual power source independent of the other. The top pan 20 will be serviced by a bracket 10 as described hereinbefore with respect to FIGS. 1 to 4. The lower pan 20a requires the off-set bracket 110 wherein its cover area 112 fits over the opening of pan 20a, whereby its meter support area 111 is off-set to the right of pan 20a, as illustrated in FIG. 9, to support a separate meter 15.

It will be apparent that the numerals above 109 designate parts of the FIGS. 5-9 embodiment which correspond to the numerals previously employed to designate similar parts of the FIGS. 1-4 embodiment of the invention (e.g. brackets 10 and 110, etc.).

Meter connectors 145, 146 and 147 are formed on mounting bracket 110, whereby each connector is provided with a correlated bus bar 155, 156 and 166, as illustrated in FIG. 7. Prongs 156, 157, 167 and 168 are the counterparts of previously described respective prongs 56, 57, 67 and 68. Since the bus bars 155, 165 and 166 must extend laterally because of the off-set structure of pan 110, it is preferably to cover these bus bars by a flat insulator member 93 bolted to bracket 110 to avoid exposure of 110 voltage current carrying bus bars.

The afore-described novel mounting brackets implement the conversion of previously installed electrical wiring service connections, to permit efficient change of available service capacities. Primary advantage of the novel means here provided resides in the safety and efficiency with which service entry wiring may be changed permitting maintenance of continuity of original service conditions pending change of the meter by the utility company.

This is most readily accomplished by the electrician installing the meter pan 20 (and pan 20a) and wiring required to accommodate new service conditions. Pending the change of the meter or meters necessitated by the new service conditions, the old meter 15 is readily coupled to the new service wiring in a secured and safe fashion, permitting the maintenance of original service conditions pending the meter replacement.

This is accomplished by installing the new meter pan 20 of the type illustrated in FIGS. 1 and 5. The original meter 15 employed for the original service is coupled to the new meter pan 20 by means of the novel meter supporting and mounting bracket 10 or 110, as viewed in FIGS. 1 to 5, respectively. Meter 15 is secured to bracket 10 or 110 by positioning connectors 45, 46, 47 (or 145, 146, 147) in meter terminal sockets 35a, 36a, 37a. Connectors 45, 46, 47 are preferably of a gauge providing for structural rigidity of the connector sufficient to support the meters 15 over meter support area 11 or 111.

Final coupling of the meter(s) into the service circuit to provide for continuity of service pending replacement is accomplished by forcing the prongs at the ends of the bus bars 55, 65 and 66 (or 155, 165 and 166) into the jaws of meter pan 20, thereby effecting connection of the meter(s) to complete the circuit necessary to provide for continuity of electrical service.

The above disclosure, as described, is of an installation implementing conversion from a two wire to a three wire system. It will, however, be understood by those skilled in the art that the gist of the invention resides in the provision of means for effecting efficient, rapid, safe and secure interconnection between a previously employed electrical service meter and a newly installed service entry wiring system, pending replacement of the meter by the utility company, permitting continuity of original service pending this replacement.

The above disclosure has been given by way of illustration and elucidation, and not by way of limitation, and is desired to protect all embodiments of the herein disclosed inventive concept within the scope of the appended claims.

What is claimed is:

1. Means for converting a previously installed electrical wiring system to a new service system, in order to change available electric service capacities, said wiring system having an electric service meter connected thereto and adapted to the original service capacity, said converting means comprising means mechanically supporting and electrically engaging said meter, and means for temporarily coupling said meter to said new service system through the electrical intermediary of said engaging means, so as to maintain continuity of original service in said new service system pending replacement of said meter by a new meter adapted to the changed service capacities.

2. Means for converting a previously installed electrical wiring system to a new service system, in order to change available electric service capacities, said wiring system having an electric service meter connected thereto and adapted to the original service capacity, said converting means comprising means rigidly securing and electrically engaging said meter in said new service system, covering means coupled with said securing means and shielding the exposed terminals of said new service system, and electrical connecting means between said securing means and said covering means for temporarily coupling said meter to said new service system, so as to maintain continuity of original service in said new service system through said meter pending replacement thereof by a new meter adapted to the changed service capacities.

3. Converting means as in claim 2, wherein said connecting means comprises first connector means on one side of said securing means for providing electrical contact with said meter, second connector means on the other side of said securing means for providing electrical contact with said new service system, and bus means between said connector means.

4. A meter mounting and connecting bracket for implementing service conversion of an electrical supply system having a supply line and a load line, a meter pan between the load line and the supply line, and a consumption meter supported by the pan for measuring and indicating power passing through the lines, said bracket comprising: a meter supporting board; a bus bar on said board; a first electrical connector between said bus bar and the meter; a second electrical connector between said bus bar and the supply line; and a third electrical connector between said bus bar and the load line, whereby the meter may be supported with respect to the meter pan pending provision of a new meter for the pan.

5. A mounting bracket as in claim 4, wherein said first connector comprises at least one relatively rigid conductor providing rigid support for the meter.

6. A meter mounting and connecting bracket for implementing service conversion of an electrical supply system having a supply line, a load line, a meter pan between the load line and the supply line, and a consumption meter supported by the pan, said bracket comprising: a meter supporting board having an area congruent with the underside of the meter; a bus bar on said board on the side thereof remote from the area immediately beneath the meter; and a relatively rigid first electrical connector between said bus bar and the meter; a second electrical connector between said bus bar and the supply line; the covering area on said bracket overlying the terminals in the meter pan; and a third electrical connector between said bus bar and the load line, whereby the meter employed for the conversion service conditions may be supported on the meter pan pending provision of a new meter adapted to the new service conditions.

7. A mounting bracket as in claim 6, wherein said meter supporting area is aligned with said covering area.

8. A mounting bracket as in claim 6, wherein said meter supporting area is off-set with respect to said covering area.

No references cited.